(12) United States Patent
Muni

(10) Patent No.: US 7,387,250 B2
(45) Date of Patent: Jun. 17, 2008

(54) SYSTEM AND METHOD FOR ON THE SPOT PURCHASING BY SCANNING BARCODES FROM SCREENS WITH A MOBILE DEVICE

(75) Inventor: Ashish Muni, Flushing, NY (US)

(73) Assignee: Scanbuy, Inc., New York, NY (US)

( * ) Notice: Subject to any disclaimer, the term of this patent is extended or adjusted under 35 U.S.C. 154(b) by 425 days.

(21) Appl. No.: 10/993,970

(22) Filed: Nov. 19, 2004

(65) Prior Publication Data

US 2005/0125301 A1 Jun. 9, 2005

Related U.S. Application Data

(60) Provisional application No. 60/526,605, filed on Dec. 4, 2003.

(51) Int. Cl.
*G06K 7/10* (2006.01)
(52) U.S. Cl. .................. 235/462.01; 235/383
(58) Field of Classification Search ............ 235/454, 235/462.01, 472.01, 472.02, 383, 462.45
See application file for complete search history.

(56) References Cited

U.S. PATENT DOCUMENTS

| | | | |
|---|---|---|---|
| 4,238,768 A | 12/1980 | Mitsuya et al. | |
| 4,323,973 A | 4/1982 | Greenfield | |
| 4,554,593 A | 11/1985 | Fox et al. | |
| 4,578,766 A | 3/1986 | Caddy | |
| 4,692,603 A | 9/1987 | Brass et al. | |
| 4,728,783 A | 3/1988 | Brass et al. | |
| 4,754,127 A | 6/1988 | Brass et al. | |
| 4,774,569 A | 9/1988 | Morton et al. | |
| 4,782,221 A | 11/1988 | Brass et al. | |
| 4,874,936 A | 10/1989 | Chandler et al. | |
| 4,896,029 A | 1/1990 | Chandler et al. | |
| 4,969,202 A | 11/1990 | Groezinger | |

(Continued)

FOREIGN PATENT DOCUMENTS

WO WO-2005/020140 A2 3/2005

(Continued)

OTHER PUBLICATIONS

U.S. Appl. No. 09/883,933, filed Jun. 20, 2001, Olivier Attia.

(Continued)

*Primary Examiner*—Michael G. Lee
*Assistant Examiner*—Paultep Savusdiphol
(74) *Attorney, Agent, or Firm*—Wilmer Cutler Pickering Hale and Dorr LLP

(57) ABSTRACT

The present invention enables users to instantly purchase desired items with their mobile device (e.g., cell phone/PDA) while viewing services such as the Home Shopping Network, QVC, etc. on television or the Internet (using a PC). When the service displays a product on-screen, a barcode would also be displayed associated with the product being sold. To purchase the item, the user utilizes a camera-equipped mobile device to scan the on-screen barcode. The barcode information and user information is then sent to the vendor's server where it is processed. The preexisting transaction system is used to complete the user's transaction. Once the transaction has been complete, the vendor's server sends a confirmation message to the mobile device.

21 Claims, 2 Drawing Sheets

U.S. PATENT DOCUMENTS

| | | |
|---|---|---|
| 4,998,010 A | 3/1991 | Chandler et al. |
| 5,016,118 A | 5/1991 | Nannichi |
| 5,103,490 A | 4/1992 | McMillin |
| 5,113,454 A | 5/1992 | Marcantonio et al. |
| 5,153,418 A | 10/1992 | Batterman et al. |
| 5,179,599 A | 1/1993 | Formanek |
| 5,189,292 A | 2/1993 | Batterman et al. |
| 5,223,701 A | 6/1993 | Batterman et al. |
| 5,235,172 A | 8/1993 | Oehlmann et al. |
| 5,243,443 A | 9/1993 | Eschbach |
| 5,243,444 A | 9/1993 | Fan |
| 5,243,655 A | 9/1993 | Wang |
| 5,276,315 A | 1/1994 | Surka |
| 5,327,240 A | 7/1994 | Golston et al. |
| 5,331,442 A | 7/1994 | Sorimachi et al. |
| 5,345,317 A | 9/1994 | Katsuno et al. |
| 5,424,524 A | 6/1995 | Ruppert et al. |
| 5,510,604 A | 4/1996 | England et al. |
| 5,621,203 A | 4/1997 | Swartz et al. |
| 5,691,773 A | 11/1997 | Wang et al. |
| 5,767,978 A | 6/1998 | Revankar et al. |
| 5,774,874 A | 6/1998 | Veeneman et al. |
| 5,778,092 A | 7/1998 | MacLeod et al. |
| 5,783,811 A | 7/1998 | Feng et al. |
| 5,811,781 A | 9/1998 | Ackley |
| 5,852,677 A | 12/1998 | Nakamura et al. |
| 5,862,270 A | 1/1999 | Lopresti et al. |
| 5,877,486 A | 3/1999 | Maltsev et al. |
| 5,890,021 A | 3/1999 | Onoda et al. |
| 5,909,505 A | 6/1999 | Katayama et al. |
| 5,915,039 A | 6/1999 | Lorie et al. |
| 5,963,669 A | 10/1999 | Wesolkowski et al. |
| 5,969,325 A | 10/1999 | Hecht et al. |
| 6,045,515 A | 4/2000 | Lawton |
| 6,061,057 A | 5/2000 | Knowlton et al. |
| 6,082,619 A | 7/2000 | Ma et al. |
| 6,091,511 A | 7/2000 | Ben Dror et al. |
| 6,101,285 A | 8/2000 | Fan |
| 6,115,488 A | 9/2000 | Rogers et al. |
| 6,115,508 A | 9/2000 | Lopresti et al. |
| 6,137,898 A | 10/2000 | Broussard et al. |
| 6,144,848 A | 11/2000 | Walsh et al. |
| 6,167,383 A | 12/2000 | Henson |
| 6,201,612 B1 | 3/2001 | Matsushiro et al. |
| 6,201,901 B1 | 3/2001 | Zhou et al. |
| 6,249,773 B1 | 6/2001 | Allard |
| 6,282,307 B1 | 8/2001 | Armato, III et al. |
| 6,347,156 B1 | 2/2002 | Kamada et al. |
| 6,366,696 B1 | 4/2002 | Hertz et al. |
| 6,371,373 B1 | 4/2002 | Ma et al. |
| 6,418,244 B2 | 7/2002 | Zhou et al. |
| 6,431,452 B2 | 8/2002 | Feng |
| 6,446,868 B1 | 9/2002 | Robertson et al. |
| 6,512,919 B2 | 1/2003 | Ogasawara |
| 6,565,003 B1 | 5/2003 | Ma |
| 6,577,861 B2 | 6/2003 | Ogasawara |
| 6,585,157 B2 | 7/2003 | Brandt et al. |
| 6,604,682 B2 | 8/2003 | Wakamiya et al. |
| 6,631,012 B2 | 10/2003 | Athens et al. |
| 6,631,843 B2 | 10/2003 | Schuessler |
| 6,650,766 B1 | 11/2003 | Rogers et al. |
| 6,651,053 B1 | 11/2003 | Rothschild |
| 6,674,919 B1 | 1/2004 | Ma et al. |
| 6,735,341 B1 | 5/2004 | Horie et al. |
| 6,735,745 B2 | 5/2004 | Sarig et al. |
| 6,752,317 B2 | 6/2004 | Dymetman et al. |
| 6,802,450 B2 | 10/2004 | Cheung et al. |
| 6,832,729 B1 | 12/2004 | Perry et al. |
| 6,837,432 B2 | 1/2005 | Tsikos et al. |
| 6,850,901 B1* | 2/2005 | Hunter et al. ................. 705/26 |
| 6,898,329 B1 | 5/2005 | Takahashi et al. |
| 7,287,696 B2 | 10/2007 | Attia et al. |
| 7,296,747 B2 | 11/2007 | Rohs et al. |
| 2001/0032252 A1 | 10/2001 | Durst, Jr. et al. |
| 2001/0041581 A1 | 11/2001 | Hansson |
| 2002/0049637 A1 | 4/2002 | Harman et al. |
| 2002/0060246 A1* | 5/2002 | Gobburu et al. ....... 235/462.46 |
| 2002/0065728 A1* | 5/2002 | Ogasawara .................. 705/23 |
| 2002/0071076 A1* | 6/2002 | Webb et al. ................. 349/117 |
| 2002/0084330 A1 | 7/2002 | Chiu |
| 2002/0090107 A1 | 7/2002 | Acharya et al. |
| 2002/0102966 A1* | 8/2002 | Lev et al. .................... 455/412 |
| 2002/0187774 A1 | 12/2002 | Ritter et al. |
| 2003/0007696 A1 | 1/2003 | Saito |
| 2003/0065738 A1* | 4/2003 | Yang et al. ................. 709/215 |
| 2003/0074286 A1 | 4/2003 | Rodrigo |
| 2003/0123710 A1 | 7/2003 | Nakazawa et al. |
| 2003/0132298 A1* | 7/2003 | Swartz et al. .......... 235/472.02 |
| 2003/0230630 A1* | 12/2003 | Whipple et al. ........ 235/462.01 |
| 2004/0042670 A1 | 3/2004 | Moroo et al. |
| 2004/0101183 A1 | 5/2004 | Mullick et al. |
| 2004/0240737 A1 | 12/2004 | Lim et al. |
| 2005/0035206 A1 | 2/2005 | Attia et al. |
| 2005/0121521 A1 | 6/2005 | Ghai et al. |
| 2005/0198095 A1 | 9/2005 | Du et al. |
| 2006/0011728 A1 | 1/2006 | Frantz et al. |

FOREIGN PATENT DOCUMENTS

WO     WO-05/062234 A2     7/2005

OTHER PUBLICATIONS

Lycos and Net Perceptions Launch Unbiased Cross-Merchant Product Recommendation Service, PR Newswire, New York: Nov. 16, 1999, pp. 1-3.

Bottller, Stefan, "SMS-Flaschenpost erreicht Millionen," W&V Wochenmagazin Fur Marketing, Werbung, Medien und E-Business, Nov. 28, 2003, pp. 44-45.

Heckbert, Paul S., "Fundamentals of Texture Mapping and Image Warping," Department of Electrical Engineering and Computer Science, University of California, Master's Thesis, 1989.

Lew, Michael S., "Prinicples of Visual Information Retrieval," State of the Art in Shape Matching, 2001, pp. 87-119.

Rohs, Michael et al., "Entry Points into a Smart Campus Environment—Overview of the ETHOC System," Institute for Pervasive Computing Swiss Federal Institute of Technology, May 2003.

Trier, O.D., Jain, A.K., "Goal-Directed Evaluation of Binarization Methods", Pattern Analysis and Machine Intelligence, IEEE Transactions on, Dec. 1995, ISSN: 0162-8828.

Tsai, Roger Y., "A Versatile Camera Calibration Tedhnique for High-Accuracy 3D Maching Vision metrology Using Off-the-Shelf TV Cameras and Lenses," IEEE Journal of Robotics and Automation, 1987, RA-3(4):323-344.

Wellner, Pierre D., "Adaptive Thresholding for the DigitalDesk," EuroPARC Technical Report EPC-93-110, 1993, pp.1-17.

\* cited by examiner

US 7,387,250 B2

SYSTEM AND METHOD FOR ON THE SPOT PURCHASING BY SCANNING BARCODES FROM SCREENS WITH A MOBILE DEVICE

PARENT CASE TEXT

This application claims the benefit of provisional application No. 60/526,605 filed Dec. 04, 2003.

FIELD OF THE INVENTION

The present invention relates generally to the field of home shopping via an interactive medium. More specifically, the present invention utilizes barcode scanning technology and mobile devices to enhance the home shopping experience of consumers.

BACKGROUND OF THE INVENTION

Home shopping originated in the 1950s and 1960s in the form of infomercials. In these original infomercials, a product would be displayed and discussed on screen for a limited amount of time during which a home user could call and order the product. This form of shopping gained instant popularity mainly due to the convenience of shopping from home and is still in use to this day.

However, it was not until the 1980s that the first major advancement in home shopping technology occurred. In 1982, the Home Shopping Network ("HSN") debuted as the first cable channel exclusively dedicated to home shopping. The channel operated virtually continuously and displayed thousands of products for sale. To order a product, a user only had to call the HSN toll-free telephone number and place an order.

Since 1982, the home shopping industry has increased exponentially and many other companies, such as QVC, have emerged as industry leaders. Currently, there are many different types of home shopping channels. Some sell many different types of merchandise while others sell only specific types of merchandise such as collectibles.

However, home shopping does have its drawbacks. To order each item, a user must call the shopping service and order the product through an automated service or through an operator. This can be burdensome when a consumer desires to order many products. Additionally, this method of ordering may not be possible for consumers who are hard of hearing or otherwise handicapped.

Therefore, there clearly exists a need for a system which simplifies the home ordering process. The system should easily integrate with the preexisting home shopping application while offering the consumer a simpler and streamlined ordering method.

SUMMARY OF THE INVENTION

The present invention provides a home shopping application which utilizes barcode scanning technology and mobile devices. It enables users to instantly purchase desired items with their mobile device (e.g., cell phone/PDA) while viewing services such as the Home Shopping Network, QVC, etc. on television or the Internet (using a PC).

The invention allows users to scan barcodes associated with anything being sold and displayed on screen. When the service displays a product on-screen, a barcode would also be displayed associated with the product being sold. To purchase the item, the user utilizes a camera-equipped mobile device to scan the on-screen barcode. The barcode may be located on a television, computer monitor, PDA screen, other mobile device screen, etc. It should be obvious to one skilled in the art that the screen may be any screen capable of being scanned.

Systems and methods for decoding barcodes from digital images are disclosed in co-pending U.S. patent application Ser. No. 10/757,095 entitled "System and method for decoding and analyzing barcodes using a mobile device" and U.S. patent application Ser. No. 10/796,153 entitled "System and method for decoding barcodes using digital imaging techniques." The first referenced application (the '095 application) discloses a system for decoding the barcode directly on the mobile device whereas the second referenced application (the '153 application) discloses a system for decoding the barcode by sending the image to a server for decoding.

Once the user has scanned the barcode, the barcode information along with the user's information is sent to the vendor's server. In the preferred embodiment of the present invention, this information is transmitted via a MMS.

In general, the transmitted user information includes information related to the user's account and payment information. For example, the user information may include, but is not limited to, a user identification number, username, password, payment type, home address, billing address, credit card number, credit card expiration date, and bank account number.

The vendor's server then utilizes the transmitted barcode and user information to complete the transaction for the user. Generally, the user will have a pre-existing system for completing user transactions. After the vendor's server has completed the transaction, a SMS or MMS is transmitted to the vendor's mobile device to indicate that the item has been purchased.

Therefore, it is an object of the present invention to provide a home shopping system which is scalable for wireless carriers wishing to provide new applications to existing mobile devices and/or customers.

It is an additional object of the present invention to provide a home shopping system whose operation is invisible to the user.

Another object of the present invention is to provide a home shopping system where no separate application is launched during operation.

An additional object of the present invention is to provide a home shopping system which simplifies the purchasing process for users.

Yet another object of the present invention is to provide a home shopping system which enables current marketing channels to target a new group of users at the same time through the use of the present invention.

These and other objects of the present will be made clearer with reference to the following detailed description and accompanying drawings.

DETAILED DESCRIPTION OF THE PREFERRED EMBODIMENT(S)

The following presents a detailed description of a preferred embodiment of the present invention. However, it should be apparent to one skilled in the art that the described embodiment may be modified in form and content to be optimized for a wide variety of situations.

Figure 1:
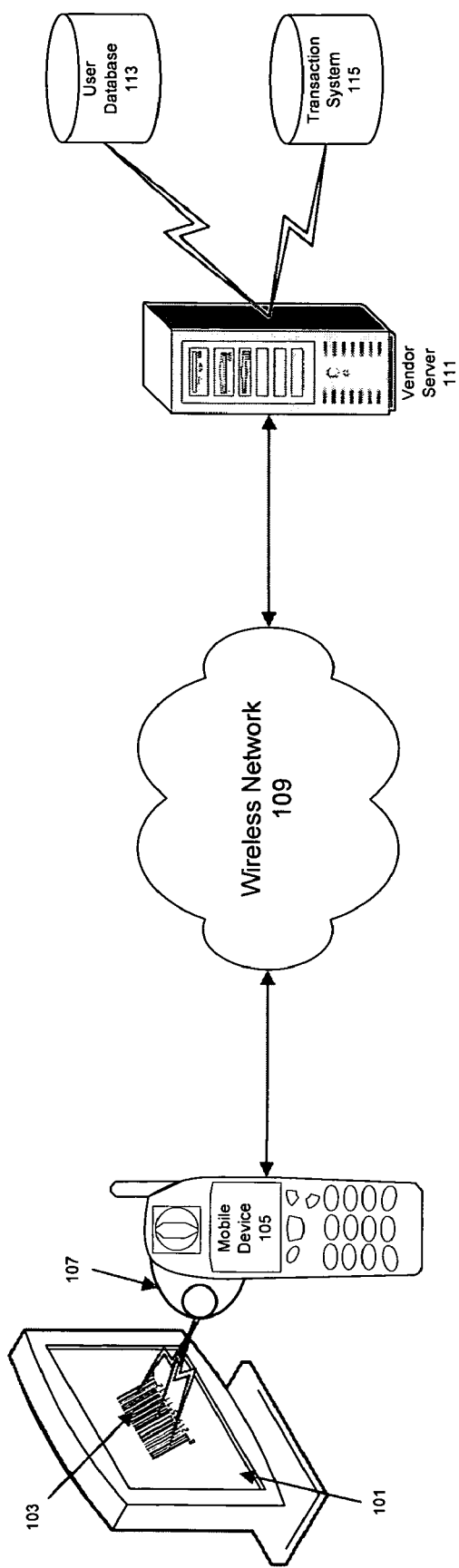
FIG. 1 depicts a schematic diagram of the network configuration utilized in the preferred embodiment of the invention.

With reference first to FIG. 1, shown is a schematic diagram depicting the setup of the preferred embodiment of the present invention. The present invention enables users to instantly purchase desired items with their mobile device (e.g., cell phone/PDA) while viewing services such as the Home Shopping Network, QVC, etc. on television or the Internet (using a PC).

In FIG. 1, display 101 is shown displaying barcode 103. Monitor 101 may be any device capable of displaying a barcode on-screen such as a CRT television, an LCD panel, a computer monitor, a laptop monitor, a PDA screen, a mobile device display, etc. Barcode 103 may be any one or two-dimensional machine-readable code which mobile device 105 may scan. In the preferred embodiment of the present invention, barcode 103 is a barcode from the UPC family. Other symbologies include, but are not limited to, UPC-A, UPC-E, ISBN, RSS-14, RSS-14E, RSS-14L, Interleaved 2 of 5, EAN/JAN-8, EAN/JAN-13, Code 39, Code 39 Full ASCII, Code 128, PDF417, QR Code, Data Matrix, and Optical Intelligence 2D.

Mobile device 105 may be any device capable of transmitting data over the wireless network such as a cell phone, a camera phone, a personal digital assistant, a web camera attached to a computer, etc. Mobile device 105 additionally includes scanner 107 which allows mobile device 105 to scan barcode 103. Scanner 103 may be any device embedded or attached to mobile device 105 which allows it to scan barcode 103.

Wireless network 109 may be any network capable of transmitting information wirelessly between mobile device 101 and server 111. For example, the wireless network could be a cellular network, satellite network, Bluetooth network, Wi-Fi network, etc.

Vendor server 111 includes user database 113 and transaction system 115 and communicates with mobile device 105 via wireless network 109. User database 113 stores information related to each user such as a user identification number, username, password, billing address, credit card number, etc. Transaction system 115 is the system used by the vendor to control all transactions. The home shopping application of the present invention seamlessly integrates with the pre-existing transaction system 115 and does not require any modification by the vendor for compatibility.

Figure 2:
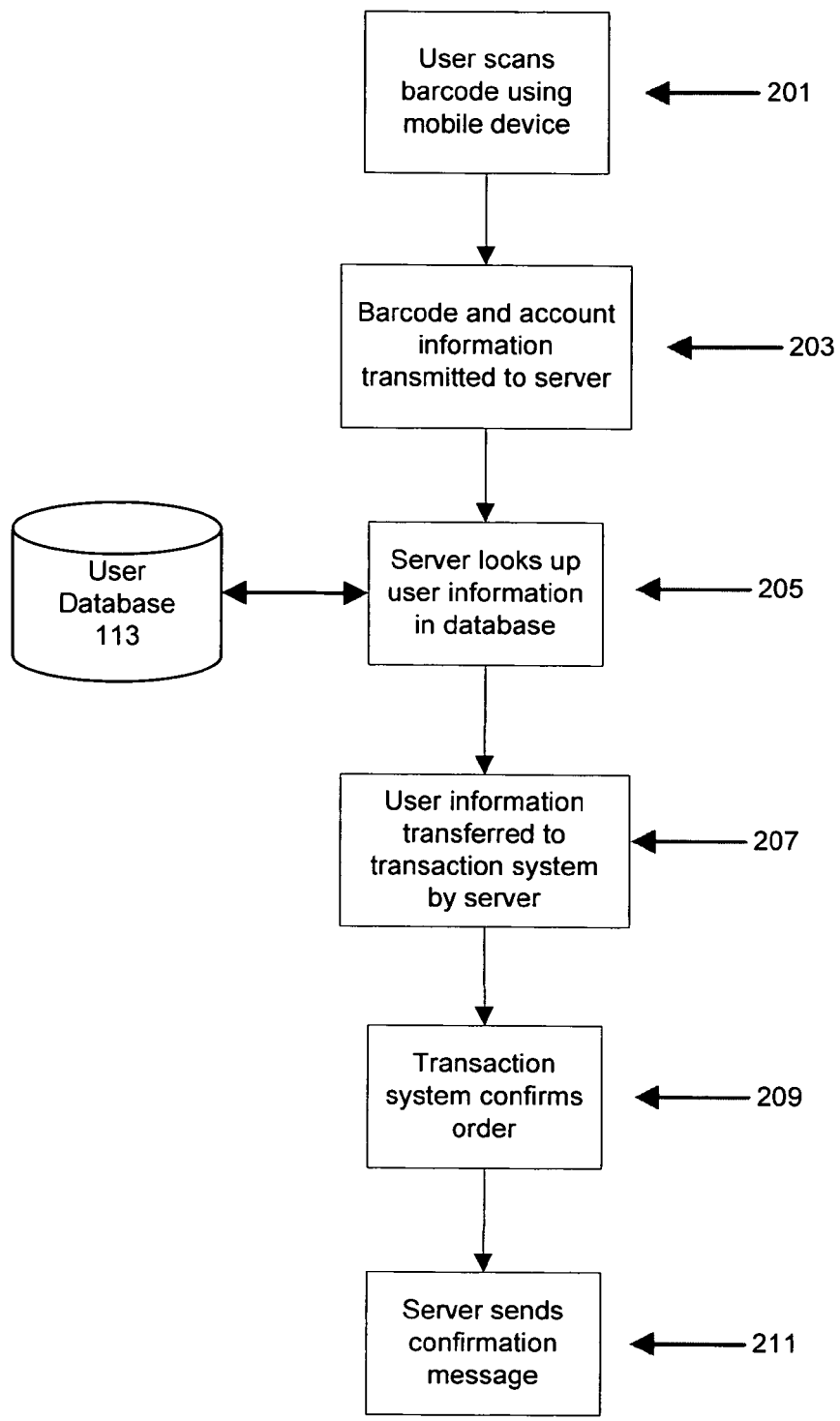
FIG. 2 depicts a flowchart showing the steps the present invention utilizes each time a transaction occurs.

Referring next to FIG. 2, shown is a flowchart depicting the steps required by the home shopping application of the present invention to order a product. To order a product which is displayed by a vendor on screen 101, a user must use mobile device 105 to scan barcode 103 in step 201. As previously mentioned, mobile device 105 is equipped with scanner 107 which enables it to scan barcodes. In the preferred embodiment of the present invention, scanner 107 is a digital camera. A system for decoding barcodes on mobile devices from digital images is disclosed in co-pending U.S. patent application Ser. No. 10/757,095 entitled "System and method for decoding and analyzing barcodes using a mobile device." The user could also decide to take a picture of the barcode using scanner 107 and send the snapshot or the raw data constituting the image to the control center to be decoded server 111 instead of on mobile device 105. Such a system is disclosed in co-pending U.S. patent application Ser. No. 10/796,153 entitled "System and method for decoding barcodes using digital imaging techniques."

Alternatively, scanner 107 may be a laser-based scanner which is integral to or attached to mobile device 101. Currently, laser-based scanners are the most commonly used barcode scanners. However, they generally lack the versatility of optical barcode scanners and can only usually decode a limited number of barcode symbologies.

Once the barcode has been decoded in step 201, the barcode information along with the user's account information is sent to the vendor server in step 203. The vendor server then uses user database 113 to authenticate the user and look up the user's payment and account information in step 205. This information is passed to transaction system 115 by server 111 in step 207 in order to complete the order of the item.

Next, transaction system 115 processes the received order and user information in step 209. Once the order has been confirmed by transaction system 115, server 111 sends a confirmation message to mobile device 105 to indicate that the transaction is completed in step 211. In the preferred embodiment of the present invention, this information is transmitted via a SMS or MMS.

While the foregoing embodiments of the invention have been set forth in considerable detail for the purposes of making a complete disclosure, it should be evident to one skilled in the art that multiple changes may be made to the aforementioned description without departing from the spirit of the invention.

I claim:

1. A method for facilitating purchases comprising:
   receiving barcode information at a vendor server, wherein:
      the barcode information is associated with a particular barcode scanned with a barcode scanner of a mobile device from a screen displaying a particular commerce service of a plurality of commerce services using software for scanning barcodes displayed by any of the plurality of commerce services and purchasing items of commerce associated with said barcodes from any of the plurality of commerce services;
      said particular barcode is associated with a particular item of commerce sold by said particular commerce service of the plurality of commerce services; and
      said vendor server is in communication with a user database and a transaction system of said particular commerce service;
   receiving account information at said vendor server from said mobile device;
   retrieving billing information and user information by looking up said account information in said user database;
   transmitting said billing information and said user information to said transaction system, wherein said transaction system uses said billing information and said user information to complete an order for said item of commerce and wherein said transaction system is also used by the particular commerce service for selling said item of commerce directly without using said vendor server;
   receiving a first confirmation message from said transaction system indicating that said transaction system has processed said order; and
   sending a second confirmation message, in response to receiving the first confirmation message from said transaction system, from said vendor server to said mobile device indicating that said transaction system has processed said order.

2. A method for purchasing a product by scanning barcodes according to claim 1, wherein said particular barcode is a UPC barcode.

3. A method for purchasing a product by scanning barcodes according to claim 1, wherein said particular barcode is of a symbology comprising at least one of UPC-A, UPC-E, ISBN, RSS-14, RSS-14E, RSS-14L, Interleaved 2 of 5, EAN/JAN-8, EAN/JAN-13, Code 39, Code 39 Full ASCII, Code 128, PDF417, QR Code, Data Matrix, and Optical Intelligence 2D.

4. A method for purchasing a product by scanning barcodes according to claim 1, wherein said barcode scanner comprises at least one of a laser-based barcode scanner, an optical barcode scanner, and a mobile device equipped with a digital camera.

5. A method for purchasing a product by scanning barcodes according to claim 1, wherein said barcode information and said account information are received at said vendor server via a wireless network.

6. A method for purchasing a product by scanning barcodes according to claim 1, wherein said billing information comprises at least one of a billing address, a mailing address, a shipping address, a credit card number, a personal identification number, a credit card expiration date, and a checking account number.

7. A method for purchasing a product by scanning barcodes according to claim 1, wherein said user information comprises at least one of a first name, a last name, a permanent address, an account number, a race, an age, and a sex.

8. A method for purchasing a product by scanning barcodes according to claim 1, wherein said second confirmation message is transmitted by a Short Message Service ("SMS").

9. A method for purchasing a product by scanning barcodes according to claim 1, wherein said second confirmation message is transmitted by a Multimedia Messaging Service ("MMS").

10. A method for purchasing a product by scanning barcodes according to claim 1, wherein said particular item of commerce is shipped to an address specified in said user information.

11. A method for purchasing a product by scanning barcodes according to claim 1, wherein said screen is located on a television.

12. A vendor server for facilitating purchases, comprising:
a network interface in communication with a network in communication with a transaction system and a mobile device;
a memory interface in communication with a memory storing at least a user database;
a processor in communication with the network interface and the memory interface; wherein the processor:
receives barcode information, wherein:
the barcode information is associated with a particular barcode scanned with a barcode scanner of said mobile device from a screen displaying a particular commerce service of a plurality of commerce services using software for scanning barcodes displayed by any of the plurality of commerce services and purchasing items of commerce associated with said barcodes from any of the plurality of commerce services; and
said particular barcode is associated with a particular item of commerce sold by said particular commerce service of the plurality of commerce services;

receives account information from said mobile device;
retrieves billing information and user information by looking up said account information in said user database;
transmits said billing information and said user information to said transaction system, wherein said transaction system uses said billing information and said user information to complete an order for said item of commerce and wherein said transaction system is also used by the particular commerce service for selling said item of commerce directly without using said vendor server;
receives a first confirmation message from said transaction system indicating that said transaction system has processed said order; and
sends a second confirmation message, in response to receiving the first confirmation message from said transaction system, to said mobile device indicating that said transaction system has processed said order.

13. The vendor server of claim 12, wherein said second confirmation message is transmitted by a short message.

14. A computer-readable medium containing computer-executable instructions that, when executed by a processor, cause the processor to perform a method for facilitating purchases, comprising:
receiving barcode information at a vendor server, wherein:
the barcode information is associated with a particular barcode scanned with a barcode scanner of a mobile device from a screen displaying a particular commerce service of a plurality of commerce services using software for scanning barcodes displayed by any of the plurality of commerce services and purchasing items of commerce associated with said barcodes from any of the plurality of commerce services;
said particular barcode is associated with a particular item of commerce sold by said particular commerce service of the plurality of commerce services; and
said vendor server is in communication with a user database and a transaction system of said particular commerce service;
receiving account information at said vendor server from said mobile device;
retrieving billing information and user information by looking up said account information in said user database;
transmitting said billing information and said user information to said transaction system, wherein said transaction system uses said billing information and said user information to complete an order for said item of commerce and wherein said transaction system is also used by the particular commerce service for selling said item of commerce directly without using said vendor server;
receiving a first confirmation message from said transaction system indicating that said transaction system has processed said order; and
sending a second confirmation message, in response to receiving the first confirmation message from said transaction system, from said vendor server to said mobile device indicating that said transaction system has processed said order.

15. A method for facilitating purchases, comprising:
receiving barcode information at a vendor server, wherein:

the barcode information is associated with a particular barcode scanned with a barcode scanner of a mobile device from a screen displaying a particular commerce service of a plurality of commerce services using software for scanning barcodes displayed by any of the plurality of commerce services and purchasing items of commerce associated with said barcodes from any of the plurality of commerce services;

said particular barcode is associated with a particular item of commerce sold by said particular commerce service of the plurality of commerce services; and said vendor server is in communication with a user database and a transaction system of said particular commerce service;

receiving account information at said vendor server from said mobile device;

retrieving billing information and user information by accessing said account information in said user database;

facilitating an order for said item of commerce using said billing information and said user information through said transaction system, wherein said transaction system is also used by the particular commerce service for selling said item of commerce directly without using said vendor server;

sending a confirmation message, in response to said transaction system confirming said order has been processed, from said vendor server to said mobile device indicating that said transaction system has processed said order.

16. The method of claim 15, wherein the barcode information comprises the barcode and further comprising decoding the barcode.

17. The method of claim 15, further comprising charging an account associated with the account information for the order.

18. A vendor server for facilitating purchases, comprising:
a network interface in communication with a network in communication with a transaction system and a mobile device;
a memory interface in communication with a memory storing at least a user database;
a processor in communication with the network interface and the memory interface; wherein the processor:
receives barcode information, wherein:
the barcode information is associated with a particular barcode scanned with a barcode scanner of said mobile device from a screen displaying a particular commerce service of a plurality of commerce services using software for scanning barcodes displayed by any of the plurality of commerce services and purchasing items of commerce associated with said barcodes from any of the plurality of commerce services; and
said particular barcode is associated with a particular item of commerce sold by said particular commerce service of the plurality of commerce services;
receives account information from said mobile device;

retrieves billing information and user information by accessing said account information in said user database;

facilitates an order for said item of commerce using said billing information and said user information through said transaction system, wherein said transaction system is also used by the particular commerce service for selling said item of commerce directly without using said vendor server;

sends a confirmation message, in response to said transaction system confirming said order has been processed, from said vendor server to said mobile device indicating that said transaction system has processed said order.

19. The vendor server of claim 18, wherein the barcode information comprises the barcode and wherein the processor further decodes the barcode.

20. The vendor server of claim 18, wherein the processor further charges an account associated with the account information for the order.

21. A computer-readable medium containing computer-executable instructions that, when executed by a processor, cause the processor to perform a method for facilitating purchases, comprising:
receiving barcode information at a vendor server, wherein:
the barcode information is associated with a particular barcode scanned with a barcode scanner of a mobile device from a screen displaying a particular commerce service of a plurality of commerce services using software for scanning barcodes displayed by any of the plurality of commerce services and purchasing items of commerce associated with said barcodes from any of the plurality of commerce services;
said particular barcode is associated with a particular item of commerce sold by said particular commerce service of the plurality of commerce services; and
said vendor server is in communication with a user database and a transaction system of said particular commerce service;

receiving account information at said vendor server from said mobile device;

retrieving billing information and user information by accessing said account information in said user database;

facilitating an order for said item of commerce using said billing information and said user information through said transaction system, wherein said transaction system is also used by the particular commerce service for selling said item of commerce directly without using said vendor server;

sending a confirmation message, in response to said transaction system confirming said order has been processed, from said vendor server to said mobile device indicating that said transaction system has processed said order.

* * * * *